(12) United States Patent
Sampathkumaran et al.

(10) Patent No.: US 8,767,033 B2
(45) Date of Patent: Jul. 1, 2014

(54) SYSTEM AND METHOD FOR PROVIDING VIEWING ROOM SERVICES FOR NETWORK BASED CONTENT

(75) Inventors: Sriram Sampathkumaran, San Diego, CA (US); William Schupp, San Diego, CA (US); Nobukazu Sugiyama, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 488 days.

(21) Appl. No.: 13/044,409

(22) Filed: Mar. 9, 2011

(65) Prior Publication Data

US 2012/0229587 A1    Sep. 13, 2012

(51) Int. Cl.
*H04N 7/14*     (2006.01)
*G06F 15/16*    (2006.01)

(52) U.S. Cl.
USPC ............ 348/14.03; 345/419; 348/14.08; 348/79; 348/222.1; 351/210; 463/36; 705/500; 709/205; 709/219; 709/238; 709/246; 709/248; 715/751; 725/34; 725/37; 725/78; 725/115; 725/135

(58) Field of Classification Search
CPC ...................................................... H04N 21/40
USPC ........... 348/14.03, 14.08, 222.1, 79; 351/210; 705/14.72, 500, 10; 709/219, 227, 248, 709/205, 238, 246; 715/751; 725/35, 37, 725/115, 34, 78, 135; 345/419; 463/36
See application file for complete search history.

(56) References Cited

U.S. PATENT DOCUMENTS

| | | | | |
|---|---|---|---|---|
| 4,598,311 A * | 7/1986 | Bellina | .......................... | 348/79 |
| 4,859,050 A * | 8/1989 | Borah et al. | .................. | 351/210 |
| 5,025,314 A * | 6/1991 | Tang et al. | ................. | 348/14.08 |
| 6,542,938 B1 * | 4/2003 | Kamen et al. | ................. | 719/328 |
| 7,565,332 B2 * | 7/2009 | Williams et al. | .............. | 705/500 |
| 8,010,631 B2 * | 8/2011 | Brailean et al. | .............. | 709/219 |
| 8,251,819 B2 * | 8/2012 | Watkins et al. | ................. | 463/36 |
| 8,508,614 B2 * | 8/2013 | Segal | ......................... | 348/222.1 |
| 8,572,177 B2 * | 10/2013 | Goldman et al. | ............ | 709/205 |
| 2002/0083201 A1 * | 6/2002 | Iyengar et al. | ................ | 709/246 |

(Continued)

FOREIGN PATENT DOCUMENTS

| WO | WO 2008071116 | 6/2008 |
|---|---|---|
| WO | WO 2009057950 | 5/2009 |

OTHER PUBLICATIONS

Walker, G.; The Mirror-Reflections on Inhabited TV; http://ieeexplore.ieee.org/search/freesrch abstract.jsp? tp=& arnumber=629968& queryText%3D((interactive+TV)+AND+chat)%26opened Refinements%3D*% 26matchBoolean%3Dtrue%26search Field% 3DSearch+All; Published Sep. 11, 1997.

(Continued)

*Primary Examiner* — Gerald Gauthier
(74) *Attorney, Agent, or Firm* — Blakely, Sokoloff, Taylor & Zafman LLP (57) ABSTRACT

According to one embodiment of the invention, the invention relates to an electronic device that features a display unit, a storage unit and a processor. The storage unit is adapted to store a plurality of widgets. Coupled to the storage unit, the processor is adapted to control downloading of the plurality of widgets upon gaining access as a member to a viewing room, and thereafter, to control operations of the plurality of widgets in providing interactive communications with other members of the viewing room as content is being played back on the display unit.

19 Claims, 9 Drawing Sheets

(56) References Cited

U.S. PATENT DOCUMENTS

| | | | |
|---|---|---|---|
| 2003/0078972 | A1 | 4/2003 | Tapissier et al. |
| 2003/0101450 | A1 | 5/2003 | Davidsson et al. |
| 2003/0182663 | A1 | 9/2003 | Gudorf et al. |
| 2003/0195928 | A1 | 10/2003 | Kamijo et al. |
| 2005/0177861 | A1* | 8/2005 | Ma et al. ........... 725/135 |
| 2007/0198744 | A1* | 8/2007 | Wensley et al. ...... 709/248 |
| 2007/0255791 | A1 | 11/2007 | Bodlaender et al. |
| 2007/0277217 | A1 | 11/2007 | Chiang |
| 2009/0094656 | A1* | 4/2009 | Carlucci ............. 725/115 |
| 2009/0165041 | A1* | 6/2009 | Penberthy et al. ..... 725/34 |
| 2010/0229197 | A1 | 9/2010 | Yi et al. |
| 2010/0235224 | A1* | 9/2010 | Fujioka ............... 705/10 |
| 2011/0093888 | A1* | 4/2011 | Araki et al. ........... 725/37 |
| 2011/0197237 | A1* | 8/2011 | Turner ................. 725/78 |
| 2011/0221745 | A1* | 9/2011 | Goldman et al. ...... 345/419 |
| 2011/0247044 | A1* | 10/2011 | Jacoby ............... 725/115 |
| 2012/0015730 | A1* | 1/2012 | Watkins et al. ........ 463/36 |
| 2012/0023521 | A1* | 1/2012 | Lordan et al. ......... 725/35 |
| 2012/0079119 | A1* | 3/2012 | Gill et al. ............ 709/227 |
| 2012/0192084 | A1* | 7/2012 | Dura et al. ........... 715/751 |
| 2012/0229587 | A1* | 9/2012 | Sampathkumaran et al. ............. 348/14.03 |

OTHER PUBLICATIONS

The Open IPTV Forum Publishes: Release 1 IPTV Solution Specifications; http://www.tvover.net/2009/01/08/The+Open+IPTV+Forum+Publishes+Release+1+IPTV+Solution+Specifications.aspx; Published Jan. 8, 2009.

David Geerts; Comparing Voice Chat and Text Chat in a Communication Tool for Interactive Television; http://portal.acm.org/citation.cfm?id=1182537&dl=GUIDE&coll=GUIDE&CFID=90475583&CFTOKEN=58701153; Published 2006.

Morphett, J., Jessop, M.; eTV: A Mixed Reality Interface onto Inhabited TV; http://ieeexplore.ieee.org/Xplore/login.jsp?reload=true&url=http%3A%2Fieeexplore.ieee.org%2Fiel4%2F3024%2F16085%2F00744426.pdf%3Farnumber%3D744426&authDecision=-203; Published Oct. 28, 1998.

\* cited by examiner

SYSTEM AND METHOD FOR PROVIDING VIEWING ROOM SERVICES FOR NETWORK BASED CONTENT

BACKGROUND

1. Field

Embodiments of the invention relate to the field of communications. More specifically, one embodiment of the invention relates to a system and method for providing a personalized, social networking environment for viewers as well as providing more accurate and immediate viewer feedback to content providers.

2. General Background

Television is used to deliver programming to viewers. In order to watch a program together, viewers typically are required to be at the same physical location. As a result, when friends are unable to congregate, the viewer may experience less enjoyment when watching the program.

Furthermore, for televised programming directed to a certain genre, such as a sporting event for example, content providers normally position many television cameras in close proximity to the field or court in order to best capture all of the action for the event. Yet, despite having uninterrupted and non-obstructed views when watching television, in many cases, viewers would rather attend the sporting event in person. One reason is that, in many cases, the viewer is unable to experience the excitement and energy provided by a crowd or a group of friends.

A system is needed to address these issues and provide a viewing experience that simulates a virtual "viewing room" for those interested in viewing the same content.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Various embodiments of the invention relate to a system and method for providing a personalized, social networking environment during content playback. According to one embodiment of the invention, implemented within an electronic device, logic is configured to offer social networking functionality to users of the electronic device. Social networking is achieved through a "viewing room service," namely a hosted service that controls access to pre-established viewing rooms and generates instances of viewing rooms that are interpreted and rendered by a viewing room client logic implemented within electronic devices. A "viewing room" is a computing platform that at least partially assists in coordinating the operations of a plurality of widgets.

A "widget" is code that may be executed concurrently with other widgets and is adapted to perform a specific enhanced functionality such as display specific information and/or provide user interactivity with an operating system or another application. For instance, the widget may produce a window containing a video feed (and optionally audio and/or text) of other members of the viewing room. This code may be in the form of an application, applet, plug-in, routine, one or more instructions to perform the specific function where such instructions may or may not be embedded into other code, or the like.

When determined to be authorized to join a viewing room, the user accesses an instance of the selected viewing room, which is configured to identify one or more widgets that collectively support enhanced functionally for an electronic device for a user that joined the viewing room. Such functionality provides the electronic device with broadcast/multicast or peer-to-peer network capabilities in receiving information from and/or transmitting information that collectively formulates a social network during viewing of content.

In the following description, certain terminology is used to describe features of the invention. For instance, the term "electronic device" may refer to any consumer electronics that is adapted to receive transmitted content for playback as well as supporting network connectivity. For instance, an electronic device may include, but is not limited or restricted to a television, a set-top box, a personal digital assistant (PDA), a computer, a cellular telephone, a video game console, a portable video player, or the like.

The term "content" constitutes any type of information (e.g., video, audio, text, still images or any combination thereof). The content may be supplied from a "content provider," which may include, but is not limited or restricted to a terrestrial broadcaster, a cable or satellite television distribution system, a company providing content for download over the Internet or supporting the transmission of content over an Internet Protocol (IP) based network (e.g., Internet Service Provider, Wireless Fidelity "WiFi" network device, etc.).

Also, the terms "unit" and "logic" are representative of hardware and/or software configured to perform one or more functions. For instance, examples of hardware include, but are not limited or restricted to an integrated circuit such as a processor (e.g., a digital signal processor, microprocessor, application specific integrated circuit, a micro-controller, etc.). Of course, the hardware may be alternatively implemented as a finite state machine, a programmable circuit or even combinatorial logic.

An example of "software" includes executable code in the form of an application, an applet, a routine or even a series of instructions. The software may be stored in any type of non-transitory machine readable medium such as a programmable electronic circuit, a semiconductor memory device such as volatile memory (e.g., random access memory, etc.) and/or non-volatile memory (e.g., any type of read-only memory "ROM", flash memory, etc.), a hard drive disk, a portable storage device (e.g., an optical disk, a digital tape, a flash drive, etc.), or the like.

The term "interconnect" is generally defined as an information-carrying pathway for information, where the information may be content such as video, audio, text, displayable images or any combination thereof. An interconnect may be established using any communication medium such as a wired physical medium (e.g., a bus, one or more electrical wires, trace, cable, etc.) or a wireless medium (e.g., air in combination with wireless signaling technology).

The term "program" generally represents a stream of digital content that is configured for transmission to one or more electronic devices for viewing and/or listening. According to one embodiment, the program may contain MPEG (Moving Pictures Expert Group) compliant compressed video.

Lastly, the term "message" is information normally in a structured format such as a packet or cell.

While this invention is susceptible to embodiments of many different forms, there is shown in the drawings and will herein be described in detail specific embodiments, with the understanding that the present disclosure is to be considered as an example of the principles of the invention and not intended to limit the invention to the specific embodiments shown and described.

I. General Overview

An online viewing room service may be provided, where people watching an event can create and participate with other people in a customized social network thereby sharing a common viewing experience. This viewing experience is different than a composition of discrete, individual viewing experiences that may be currently offered.

For use in connection with the viewing of televised content, according to one embodiment of the invention, a viewing room is created, and thereafter, it is accessible by a user interface (UI) application stored within an electronic device.

The UI application enables a user to establish communications with a host application that controls access to a viewing room offered over the viewing room service.

An instance of the viewing room along with the widgets forming the viewing room collectively provide enhanced functionality with the programming being viewed by the user. The widgets may be configured to enable members of the viewing room to exchange broadcast, multicast or even unicast messages (e.g. text, instant messages, video and/or audio clips, etc.) that represent their thoughts or feelings surrounding the viewed event. Therefore, in some cases, everyone joining the viewing room can text/talk to or hear each other. Of course, the actions that you can perform in the viewing room may change depending on the theme and rules established for the viewing room as described below.

Furthermore, the viewing room may be configured to provide real-time feedback to a content provider as which moments in the program were enjoyed by the viewing room members. This feedback, along with precise demographic and statistical information about the members obtained through registration, may enable content providers to adjust what content should to be released in the future.

II. General Architecture

Figure 1:
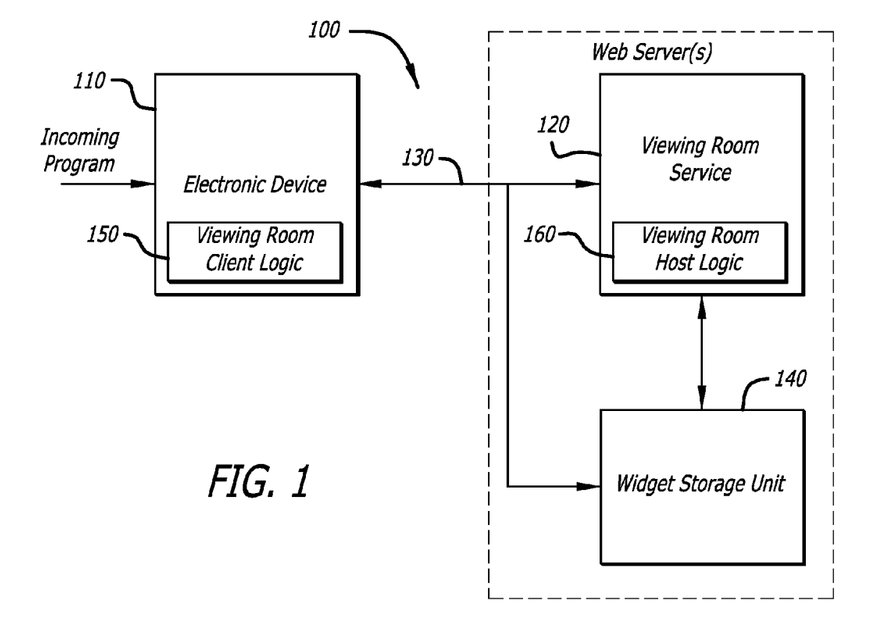
FIG. 1 is a first exemplary block diagram of a content delivery system featuring a viewing room service to provide social interactivity to the viewer.

Referring to FIG. 1, a first exemplary block diagram of a content delivery system 100 consistent with certain embodiments of the invention is shown. Content delivery system 100 comprises an electronic device 110 that receives digital content (e.g. a program) from one or more content providers (not shown). The program may be propagated as a digital data stream for example in compliance with any data compression scheme. Examples of a data compression scheme include, but are not limited or restricted to MPEG standards.

According to one embodiment of the invention, electronic device 110 decodes an incoming program for rendering during playback. Where the incoming program is audio/video, the program is played back by rendering the video on a display unit being part of (or controlled by) electronic device 110 and outputting audio to speakers being part of (or controlled by) electronic device 110.

Herein, electronic device 110 is in communication with a viewing room service 120 over an interconnect 130. According to one embodiment of the invention, viewing room service 120 is a network-based service provided by a web server that maintains viewing rooms and, in general, controls access to these viewing rooms. Viewing room service 120 further enables a user to create a viewing room, namely a platform that supports concurrent operations of one or more widgets. The widgets, when operable, provide enhanced functionality during viewing of the incoming program content. Access to the viewing room may be restrictive, depending on the access restrictions established for the viewing room when created.

For illustrative purposes, examples of enhanced functionality may include, but is not limited or restricted to the following: (i) provide shared communications between a local user and one or more persons remotely located from electronic device 110; (ii) display profiles of members for the viewing room (e.g., Facebook® profiles); and (iii) selection of a camera angle for viewing an event.

As further examples, a "video chat" widget may provide video and/or audio communications between members that have joined a viewing room. A "reaction" widget may enable members to receive and playback audio from other member(s) of the viewing room and/or watch their reactions via a video feed. Also, a "venue" widget may enable member(s) to receive secondary audio within the venue in order to get a sense of the excitement experienced if the user was attending the event. Finally, a "betting" widget may enable members to make friendly bets with each other as to the outcome of an event unfolds.

These widgets may be accessible by viewing room service 120 and stored within a widget storage unit 140, which operates as a repository (or marketplace) in providing universal or restricted access to the widgets. For instance, widgets may be developed by any user, content provider or third party and can be uploaded into widget storage unit 140. According to one embodiment, widget storage unit 140 may operate as an online store (or marketplace) that allows persons, perhaps in exchange for monetary compensation, to download widgets needed to provide the functionality offered for the selected viewing room. These widgets may be purchased or rented where the widget is disabled after a certain time period has lapsed or a usage amount has been exceeded.

Referring still to FIG. 1, electronic device 110 comprises viewing room client logic 150 that, when operating, performs operations that assist in the formulation, rendering and maintenance of a viewing room. For instance, client logic 150 is adapted to assist in (i) generating a list of available viewing rooms accessible by the user; (ii) logging on/off from a viewing room; (iii) coordinating download and install of widgets; (iv) obtaining peer information from web server (using XMPP) and making such information available to all of the widgets associated with the selected viewing room; and (v) rendering information for playback according to a form factor of electronic device 110.

As an illustrative example, viewing room client logic 150 may be adapted to control the transmission of requests to join a viewing room and to modify the viewing room if the user is provided with administrative privileges. These requests by client logic 150 are sent to viewing room host logic 160 responsible for maintaining and controlling access to these viewing rooms, where such access may require the user/device to be authenticated prior to responding the requests to join a viewing room.

Although not shown, it is contemplated that, according to one embodiment, electronic device 110 may be a television with a back casing including a processor and internal memory. Viewing room client logic 150 may be an application that is stored in internal memory and executed by the processor to perform operations such as creating viewing rooms, downloading widgets associated with these viewing rooms, and coordinating operations of the widgets to render information for playback (e.g. display, audio output, etc.). Furthermore, the processor may be adapted to execute the stored widgets in order to provide enhanced functionality for the television. Of course, in lieu of the processor/memory architecture, it is contemplated that viewing room client logic 150 may be provided as a hardware solution.

Figure 2A:
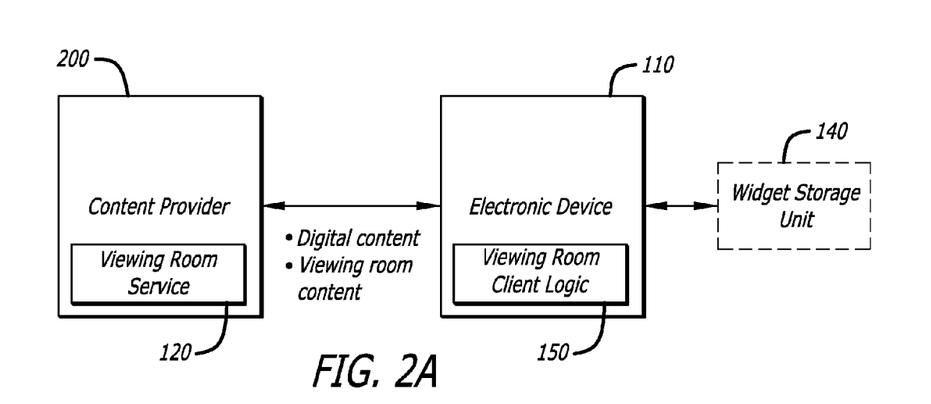
FIG. 2A is a second exemplary block diagram of content the delivery system of FIG. 1 in which the viewing room service is hosted by a content provider.

Referring now to FIG. 2A, a second exemplary block diagram of content delivery system 100 consistent with certain embodiments of the invention is shown. Content delivery system 100 comprises electronic device 110 that receives digital content, such as a digital data stream, from a content provider 200. In lieu of being hosted by a separate networked device (e.g. web server), viewing room service 120 is hosted by content provider 200. Hence, content provider 200 controls access to the viewing rooms by viewing room client logic 150 as well as administrative tasks such as creating or modifying a viewing room.

As further shown, it is contemplated that widget storage unit 140 may be optionally deployed externally from content provider 200 (as represented by dashed lines) or internally within content provider 200 (not shown). When external, content provider 200 may be provided access to stored widgets during creation of the viewing room, albeit the widgets may need to be purchased by members of the viewing room after creation.

Figure 2B:
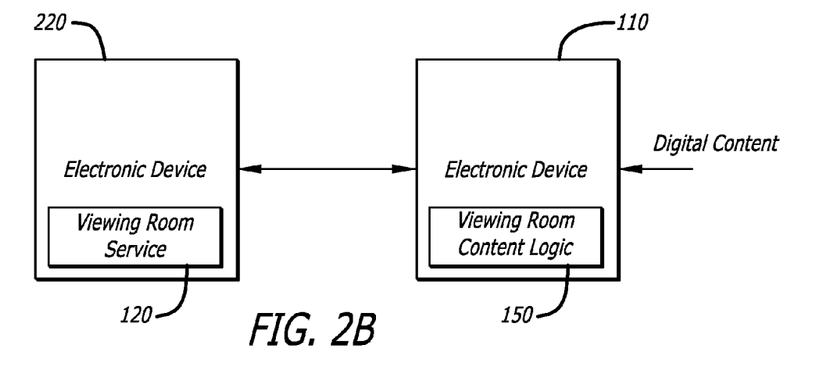
FIG. 2B is a third exemplary block diagram of the content delivery system of FIG. 1 where the viewing room service is hosted by another electronic device in communication with the electronic device.

Referring to FIG. 2B, a third exemplary block diagram of content delivery system 100 is shown. Herein, content delivery system 100 comprises electronic device 110 that receives digital content, such as a digital data stream, from a content provider. However, in lieu of being hosted by a web server or content provider, viewing room service 120 is hosted by another electronic device 220 in communication with electronic device 110. It is contemplated that both electronic devices 110 and 220 may have access to a public network, or electronic device 220 may have such access while electronic device 110 is coupled to electronic device over a local (private) network.

Figure 3:
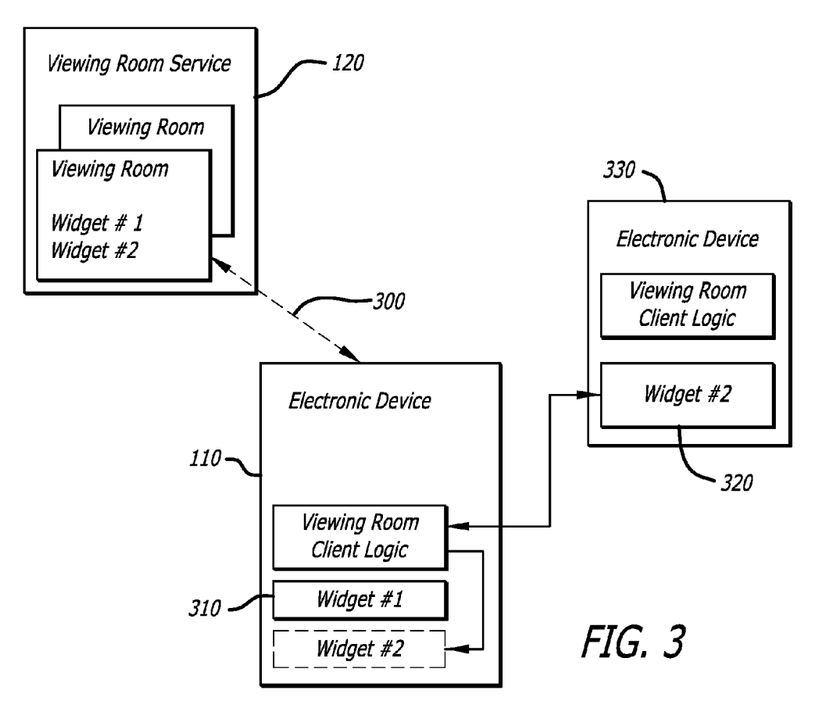
FIG. 3 is an exemplary block diagram of the content delivery system of FIG. 1 where widgets forming the viewing room are hosted by another electronic device and are accessible by the electronic device.

Similarly, as shown in FIG. 3, electronic device 110 comprises viewing room client logic 150 that is adapted to operate in combination with an instance of a specific viewing room to provide enhanced functionality. As an example, an instance of viewing room 300 may be accessible by viewing room client logic 150 to determine the order or execution of widgets 310 and 320, location of the rendering of graphic images associated with the widgets, or the like.

For rendering viewing room 300, electronic device 110 needs access to both widgets 310 and 320. Herein, electronic device 110 has internal memory that stores first widget 310 and is adapted to communicate with other devices, such as electronic device 330, to fetch second widget 320 therefrom. Hence, electronic device 110 is able to provide additional functionality offered by viewing room 300 based on widget(s) stored internally and widget(s) stored externally from but accessible by electronic device 110.

Figure 4:
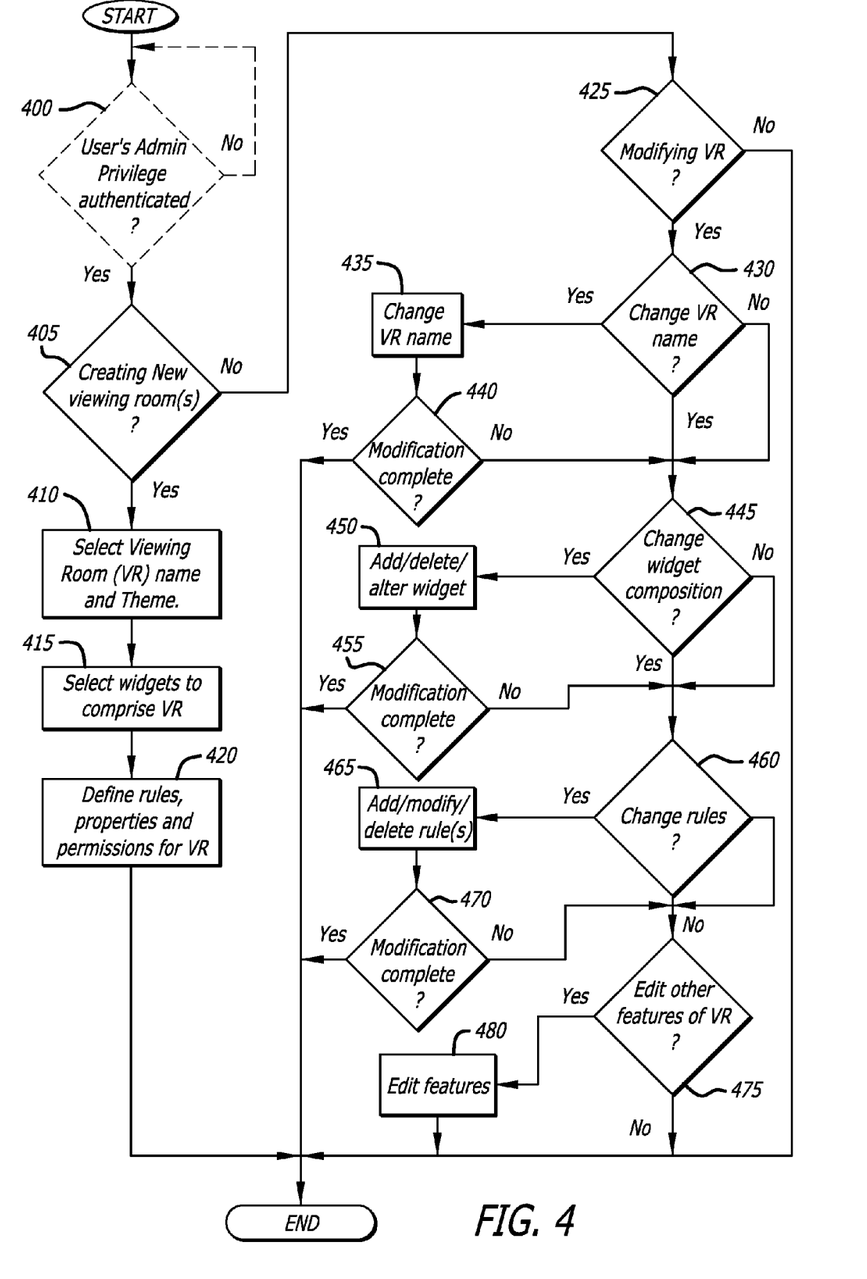
FIG. 4 is an exemplary flowchart that illustrates operations for creating and altering a viewing room by a user having administrative privileges to the content delivery system.

Referring now to FIG. 4, an exemplary flowchart illustrating operations for creating and altering a viewing room by a user having administrative privileges to the content delivery system is shown. Herein, initially, a determination is made as to whether the user, requesting to create or perform administrative operations associated with a viewing room, has been authenticated (block 400). If not, the process does not proceed until the user has been authenticated. In fact, after multiple failures to authenticate, the user may be provided with a telephone number or email address to contact for assistance. Moreover, administrative access may be further restricted to address a potential attack on the content delivery system.

If the user has been authenticated, a determination is made whether a new viewing room is being created (block 405). If so, the user may be prompted to select the name of the viewing room and select a theme for the viewing room (block 410). For instance, the "theme" may be identifying the properties associated with the viewing room and perhaps define the targeted audience. As an example, the theme may be a viewing room for soccer fans located within Southern California in which the theme can be as general as "soccer" or as specific as a specific soccer team, such as the Los Angeles Galaxy®.

Thereafter, the user will select the widgets that comprise the viewing room (block 415). These widgets are selected from a list of widgets stored within the widget storage unit that provide different features that may make the viewing experience more enjoyable as shown in Table A below. The following widgets are made accessible to the electronic device in order to provide the enhanced functionality described below.

TABLE A

| WIDGET NAME | ENHANCED FUNCTIONALITY |
|---|---|
| Video Chat | Provides a user interface to play back data (video/audio/text) feeds between members of the viewing room |
| Reaction | Provides a user interface to receive and/or transmit video and/or audio feeds between viewing room members to simulate watching a game |
| Betting | Provides a user interface that enables members to make friendly wagers with each other (and perhaps monitor/record amounts owed) |
| Game Show | Provides a user interface to receive audio/video feeds for the user to play along with a televised game show |
| Profile | Provides a user interface to organize and display one or more profiles of the viewing room members (e.g., Facebook ® profiles) |
| Camera Selection | Provides a user interface to allow the user to select a camera angle for viewing an event |
| Playback | Provides a user interface to allow the user to playback any recently viewed scene in a program and further magnify areas within the played back frame(s) |
| Trivia | Provides a user interface to search and extract trivia associated with the content being viewed for individual or team usage |
| Screenshot | Provides a user interface to capture the displayed image that can be sent to a viewing room member or via email |

Referring still to FIG. 4, the user will define the rules and permissions for the viewing room (block 420). These rules may define access to the viewing room as well as a permissible conduct followed by members of the viewing room. For instance, the rules may be directed to restricting access to the viewing room such as (i) permitting access for those responding to an electronic invite message, (ii) permitting access to particular user names or device identifiers (e.g., media access control "MAC" address); and (iii) permitting access to only persons with a certain education level or profession for networking purposes. Another rule may designate certain members who are provided lock-out privileges to remove from or prohibit re-entry into a viewing room in response to activities deemed inappropriate by the creator of the viewing room (e.g., typing swear words in a chat text area, cursing, gestures, etc.).

In the event that a new viewing room is not created, a determination is made whether a current viewing room is being modified (block 425). If not, the operation ends.

If so, a determination is made whether the viewing room name or theme is to be changed (block 430). If this feature is not to be changed, the process considers another aspect of the viewing room. Otherwise, changes are allowed to be made and such changes are stored (block 435).

After such changes, a determination is made whether there are any further modifications to the viewing room (block 440). If not, the operation ends. If so, the process considers another feature of the viewing room for alteration.

Next, a determination is made whether there is a change to the widget composition forming the viewing room (block 445). In other words, a determination is made whether any widgets are to be deleted, modified or added thereby altering the functionality of the viewing room. If not, the process considers another aspect of the viewing room. If so, one or more widgets may be deleted, added or modified (e.g., updated with newer versions, etc.) as shown in block 450. Thereafter, at least the modified/added widgets are stored so that all of the widgets forming the viewing room are stored and accessible to members. After such changes, a determination is made whether there are any further modifications to the viewing room (block 455). If not, the operation ends. If so, the process continues.

Next, a determination is made whether there is a change to the rules or properties governing the viewing room (block 460). In other words, a determination is made whether any rules that are to be deleted, modified or added thereby altering access and functionality of the viewing room. If so, one or more rules or properties may be deleted, added or modified (block 465). Thereafter, the rules and properties associated with the viewing room are stored and processed when the viewing room is accessed by a member. After such changes, a determination is made whether there are any further modifications to the viewing room (block 470). If not, the operation ends.

If so, the process continues by conducting further inquiries as to whether there are any other features of the viewing room to be modified (block 475). For instance, there may be access provisions that are not rules per se, but are desired to control access to the viewing room.

Figure 5:
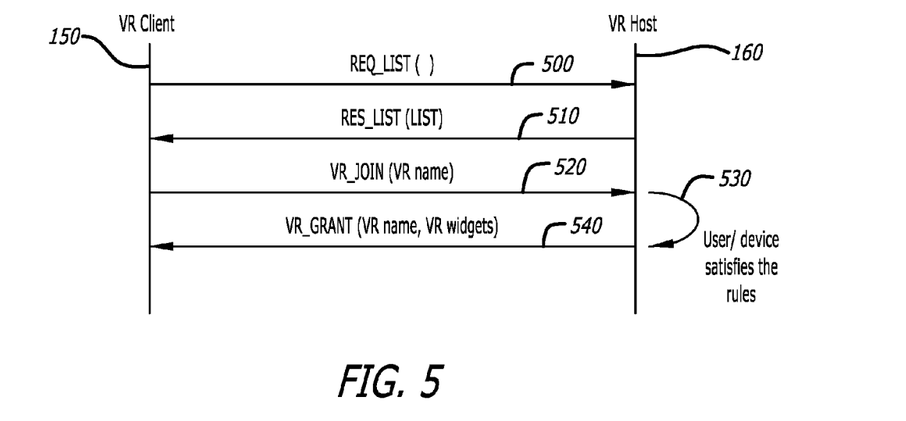
FIG. 5 is an exemplary diagram of a communication exchange between different logic units to create a viewing room.

Referring now to FIG. 5, an exemplary diagram of a communication exchange between logic, potentially implemented within different electronic devices, to create a viewing room is shown. Herein, viewing room client logic (herein "VR client 150") sends a request (REQ_LIST) message 500 to viewing room host logic (herein "VR host 160") for a list of viewing rooms. Thereafter, VR host 160 returns a response (RES_LIST) message 510 to VR client 150 with a listing of the viewing rooms that are available. This list may already account for access privileges in which the list does not contain viewing rooms that the user/device is unable to access.

Upon displaying the listing of the viewing rooms and deciding to participate in one of these viewing rooms, VR client 150 transmits a join (VR_JOIN) message 520 to request that the user join a specified viewing room, perhaps identified by its name (VR name).

In response, VR host 160 determines whether the user/device satisfies the rules and properties needed before granting access to the viewing room as designated by arrow 530. If the user/device satisfies the rules and properties associated with the viewing room, VR host 160 returns a grant (VR_GRANT) message 540 that provides at least the name of the viewing room (VR name) a listing of the widgets needed for this particular viewing room (VR widgets).

Figure 6:
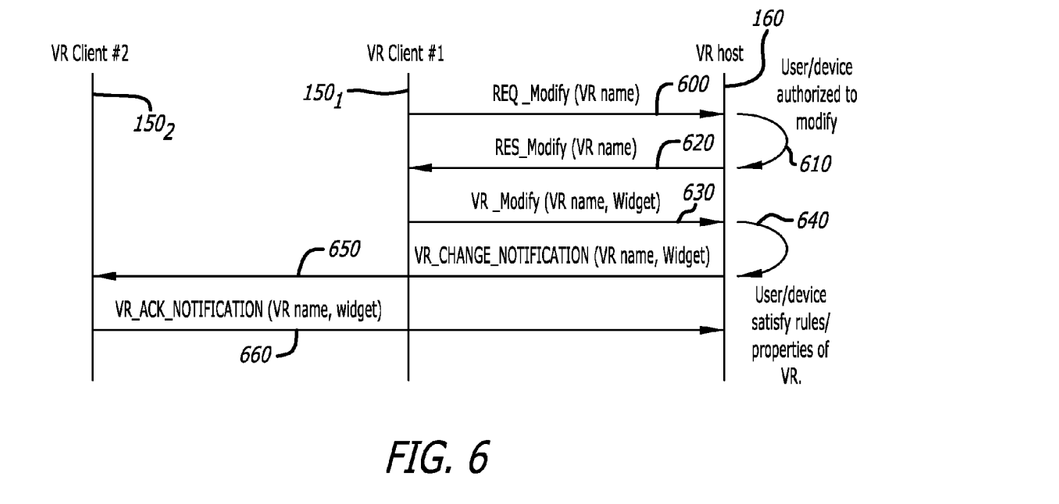
FIG. 6 is an exemplary diagram of a communication exchange between different logic units to alter a viewing room that has been created.

Referring to FIG. 6, an exemplary diagram of a communication exchange between logic, potentially implemented within different electronic devices, to alter a previously created viewing room is shown. Herein, VR client #1 $150_1$ sends a request (REQ_MODIFY) message 600 to VR host 160 to request modification of one or more identified viewing rooms. Thereafter, upon determining that VR client #1 $150_1$ is authorized to modify the viewing room as designated by arrow 610, VR host 160 returns a response (RES_MODIFY) message 620 to VR client #1 $150_1$ to identify what viewing room, if any, may be modified.

Next, VR client #1 $150_1$ transmits a modify (VR_MODIFY) message 630 to identify which viewing room is to be modified and what widget(s) are to be modified, added or deleted. In response, VR host 160 optionally determines again whether the user/device satisfies the rules and properties needed to modify the viewing room before such modifications are made as designated by arrow 640.

If the user/device satisfies the rules and properties associated with the viewing room, VR host 160 transmits a notification (VR_CHANGE_NOTIFICATION) message 650 that notifies other members of the viewing room that a widget change that has been requested. This allows current members to confirm with the VR host via an acknowledgement (VR_ACK_NOTIFICATION) message 660 that it is acceptable to change the widget as proposed. It is contemplated that absolute acceptance may be required, acceptance by a majority of members, or the like for a change to be processed.

Figure 7:
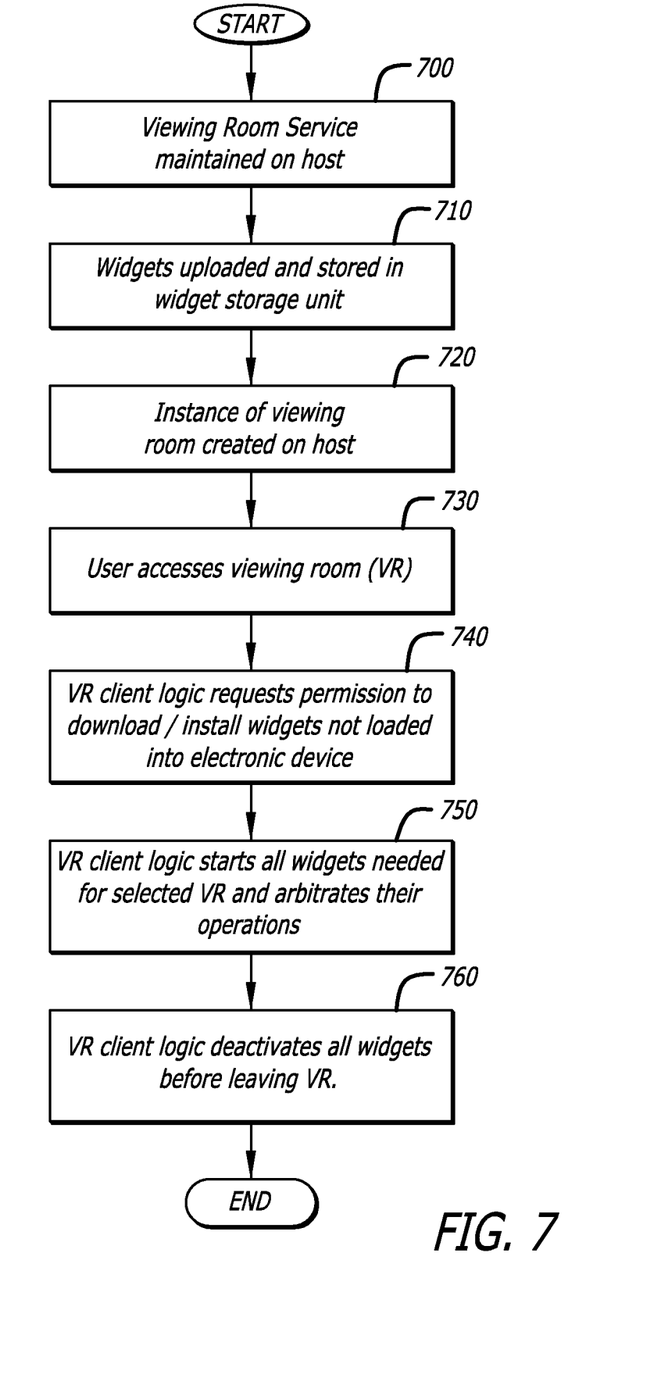
FIG. 7 is an exemplary flowchart of a sequence of operations for utilizing the viewing room service.

Referring now to FIG. 7, an exemplary flowchart of a sequence of operations for utilizing the viewing room service is shown. Herein, as illustrated in block 700, the viewing room service is maintained on a server (host server). The widgets are uploaded and present in a storage unit that operates as a centralized repository for the widgets (block 710). Thereafter, an instance of the viewing room is created on the host server (block 720). The viewing room references the widgets that are needed that collectively support its functionality.

Thereafter, a user logs into the viewing room using the viewing room client logic (block 730), where the instance of the viewing room is stored within the host server.

After logging on, the VR client logic, either automatic or based on a user request, downloads and installs widgets that are not stored within electronic device and are utilized by the viewing room (block 740). The VR client logic starts all of the widgets needed for the viewing room and arbitrates such operations (block 750).

Upon detecting that the user has decided to leave the viewing room, the VR client logic deactivates (turns off) all of the widgets utilized by the viewing room. It is contemplated that this deactivation is preferably performed before the user is logged off, although such operations are not required (block 760).

Figure 8:
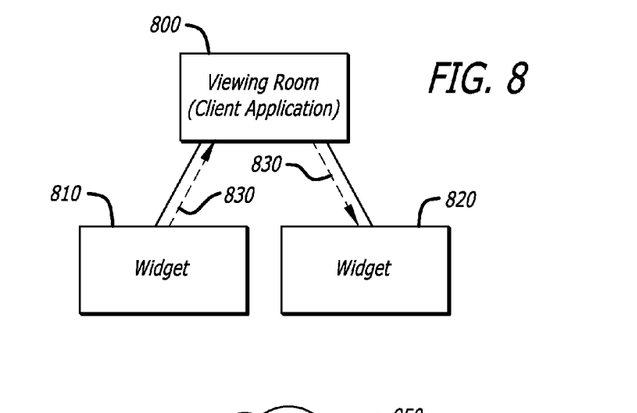
FIG. 8 is an exemplary diagram of the interactive nature of widgets implemented for the same viewing room whereby capabilities of one widget are utilized by other widgets.

Referring to FIG. 8, an exemplary diagram of the interactive nature of widgets implemented for the same viewing room is shown. Herein, viewing room 800 generally is a collection of widgets, including widgets 810 and 820. However, according to this embodiment, widget 810 utilizes the capabilities of widget 820 to provide enhanced functionality to the user as represented by dashed lines 830.

As an example, widget 810 may be a screenshot widget that captures an image that was recently rendered on the electronic device. When selected by the user, widget 810 may route the captured image to widget 820, a photo album widget, which maintains photos for viewing by members of the viewing room. This can be used to capture the favorite moments (highlights) of the game.

Figure 9:
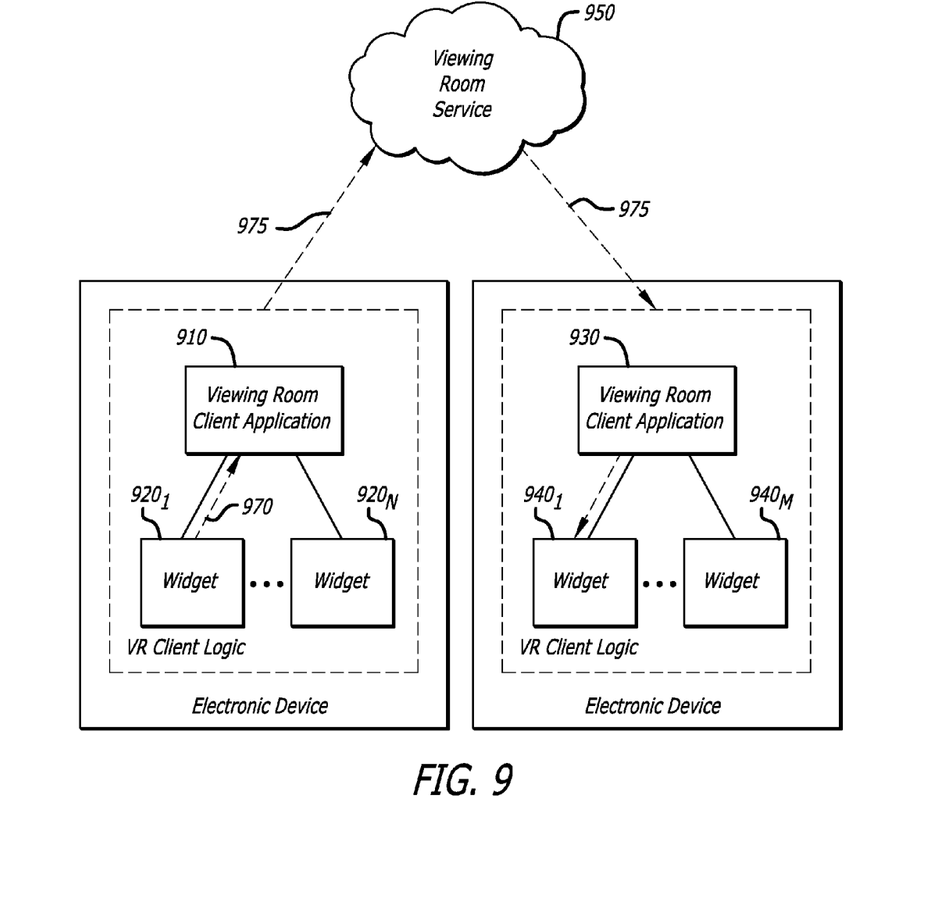
FIG. 9 is an exemplary diagram of communications between viewing room client applications.

Referring now FIG. 9, an exemplary diagram of communications between viewing room client logic is shown. Herein, a first electronic device 900 includes a viewing room client application 910 that is used to communicate with a host application that controls the functionality of a viewing room service 950. Furthermore, viewing room client application 910 arbitrates the operations of widgets $920_1$-$920_N$ (N≥1) for one or more viewing rooms currently being accessed.

Similarly, a second electronic device 925 includes a viewing room client application 930 that is used to communicate with the host application for viewing room service 950. Furthermore, viewing room client application 930 arbitrates the operations of widgets $940_1$-$940_M$ (M≥1).

For communications, using text chat widget $920_1$ for example, a text message 970 is provided to viewing room client application 910, which routes text message 970, perhaps as message 975 with a different format, to viewing room service 950. The host application of viewing room service 950 processes message 975 and determines the destination(s) for message 975. Thereafter, contents of message 975 are re-routed to electronic device 925.

Thereafter, viewing room client application 930 processes contents of message 975, determines that it is a text message, and routes the contents to widget $940_1$, namely another text chat widget. Widget $940_1$ processes the content and displays the text message from electronic device 900. Thereafter, text messages are exchanged between widgets $920_1$ and $940_1$ via viewing room client applications 910 and 930, respectively.

Figure 10A:
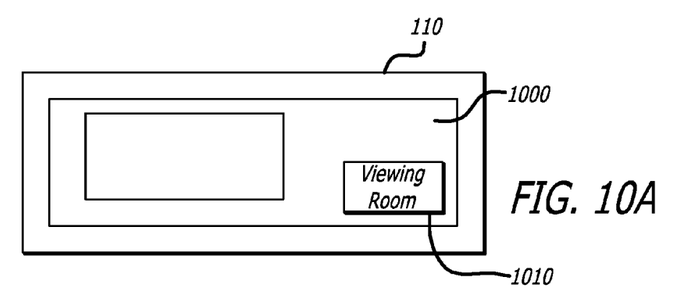
FIG. 10A is an exemplary embodiment of a display of the electronic device providing a selectable image for initiating the viewing room service.

Referring now to FIG. 10A, an exemplary embodiment of a display of electronic device 110 providing a selectable image for initiating the viewing room service is shown. Herein, electronic device 110 is a television that features a display monitor 1000 to render incoming video content. Additionally, electronic device 110 receives information over a network connection, and such information may be accessed via a menu or control panel representation or accessed by selection of a displayed icon 1010 as shown. Selection of icon 1010 denotes that the user wants to access the viewing room service.

Figure 10B:
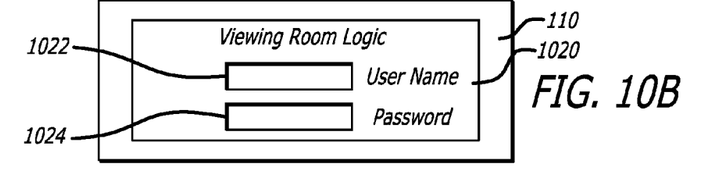
FIG. 10B is an exemplary embodiment of a display of the electronic device providing a specific user authentication scheme to determine if the viewer is authorized to access the viewing room service.

FIG. 10B is an exemplary embodiment of a display of electronic device 110 providing a specific user authentication screen to determine if the viewer is authorized to access the viewing room service. Herein, as an illustrative example, a viewing room login screen 1020 that requires the user to enter a user name 1022 and password 1024, which can be established through a registration process during initial set-up of electronic device 110 or subsequent to set-up. User name 1022 and password 1024 are routed to a separate server (or a secure application residing on electronic device 110) to authenticate the user, confirm that the user is authorized to join a viewing room (parental control) and which viewing rooms are accessible by the user.

Figure 10C:
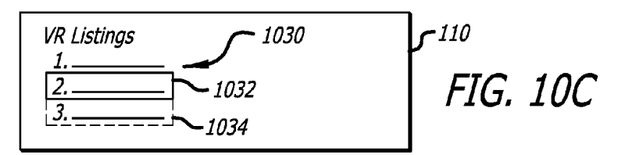
FIG. 10C is an exemplary embodiment of a display of the electronic device providing a listing of viewing room services that the viewer can join.

Thereafter, as shown in FIG. 10C, electronic device 110 receives and renders a listing 1030 of viewing rooms that the user can join. According to one embodiment of the invention, the user can select a single viewing room 1032 to join. However, it is contemplated that the viewing room service may allow the user to join multiple viewing rooms concurrently (e.g. viewing rooms 1032 & 1034), and if so, the user is able to select more than one viewing room.

Figure 10D:
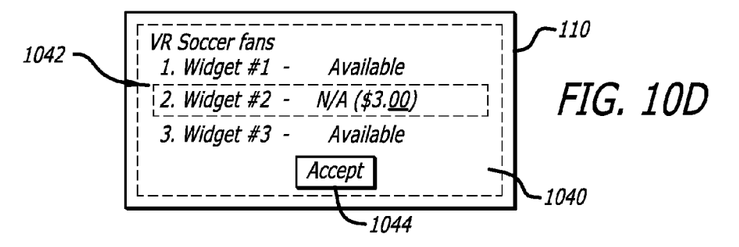
FIG. 10D is a first exemplary embodiment of a display of the electronic device providing a listing of widgets needed for rendering the viewing room selected by the viewer.

Referring now to FIG. 10D, a first exemplary embodiment of a display 1040 of electronic device 110 is shown, wherein display 1040 provides a listing 1042 of widgets needed for rendering the viewing room(s) selected by the user. Herein, listing 1042 identifies all of the widgets necessary to provide the functionality necessary for the selected viewing room. Listing 1042 further identifies which widgets are currently not available to electronic device 110 and optionally the price for purchasing/renting those widgets. The widgets can be purchased by selecting the widget and an Accept button 1044, where user acceptance is required.

Figure 10E:
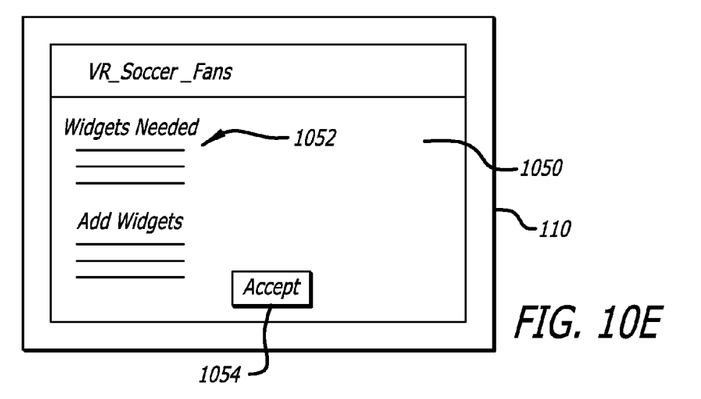
FIG. 10E is a second exemplary embodiment of a display of the electronic device providing a listing of widgets needed for rendering the viewing room selected by the viewer.

Referring now to FIG. 10E, a second exemplary embodiment of a display 1050 of electronic device 110 which provides a listing 1052 of widgets needed for rendering the viewing room(s) selected by the user is shown. Herein, unlike FIG. 10D, listing 1052 separates the widgets and identifies which widgets are currently not available to electronic device 110 and need to be purchased before joining the selected viewing room. Although not shown, once the widget is selected, additional information such as pricing, description of the widget and functionality may be provided along with an ACCEPT button 1054 that acknowledges acceptance of the purchase by the user, where user acceptance is required.

Figure 10F:
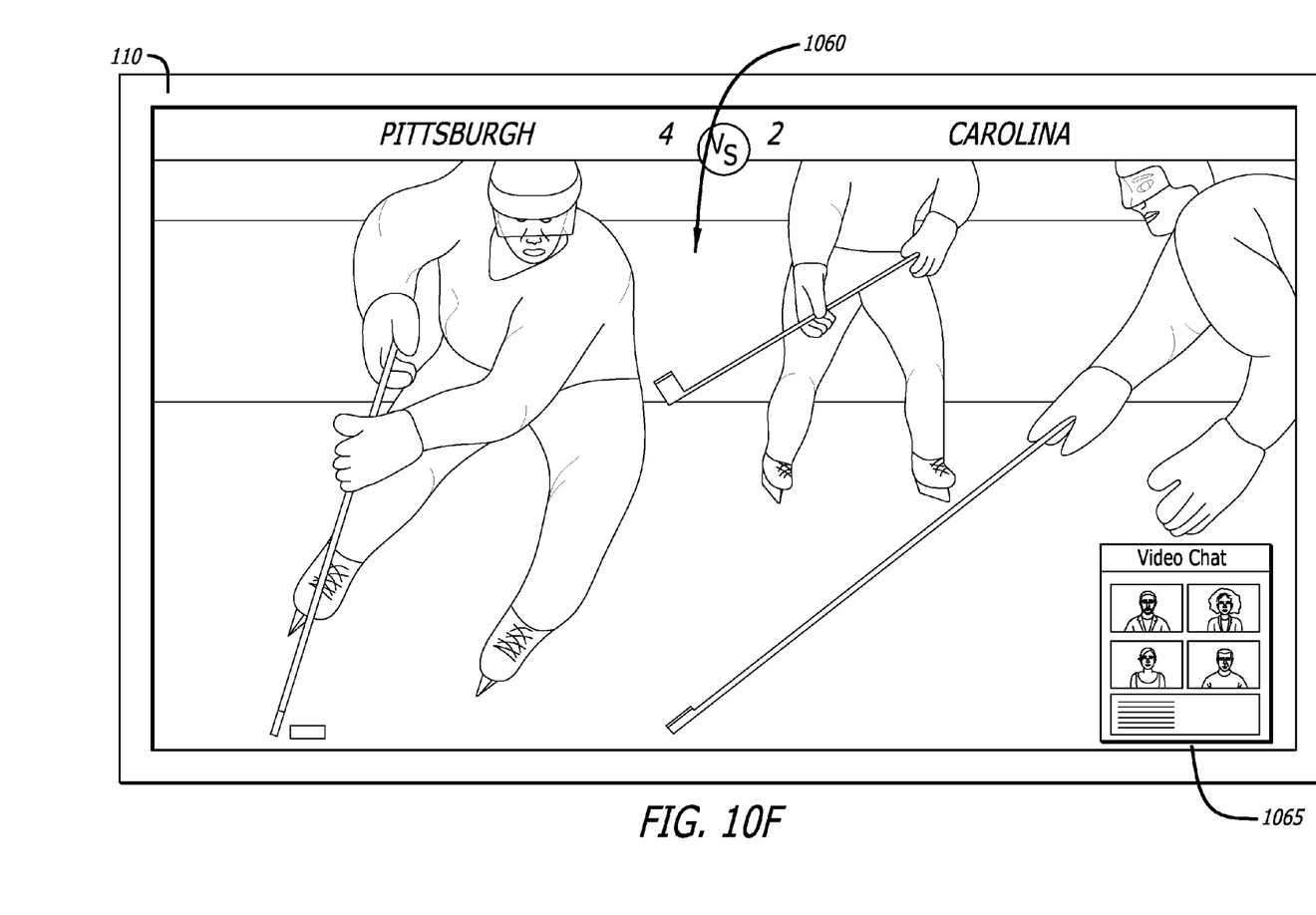
FIG. 10F is an exemplary embodiment of a display of the electronic device rendering a viewing room video chat element provided by one or more widgets forming the viewing room.

FIG. 10F is an exemplary embodiment of a display of the electronic device rendering a viewing room video chat element provided by one or more widgets forming the viewing room. Sporting event programming 1060 is supplied by the content provider and displayed along with a video chat window 1065. Video chat window 1065 is formulated from one or more widgets that, during operation and under control of the viewing room client application executed by electronic device 110, enable the user to communication with other users in the same viewing room over a network.

Figure 10G:
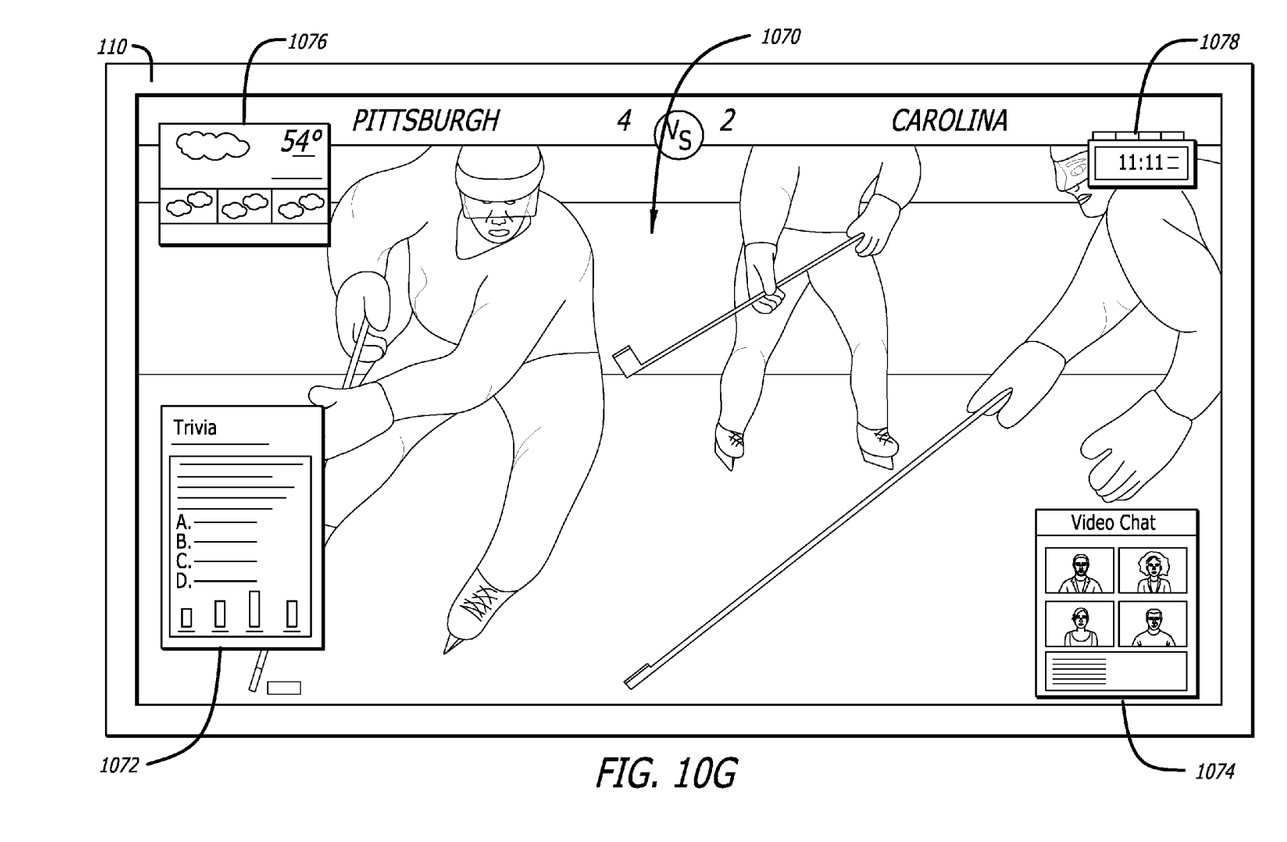
FIG. 10G is an exemplary embodiment of a display of the electronic device rendering multiple viewing room elements including Net Trivia™, video chat, weather and clock provided by one or more widgets forming the viewing room.

Similarly, FIG. 10G is an exemplary embodiment of a display 1070 of electronic device 110 rendering multiple viewing room elements including Net Trivia™ 1072, video chat 1074, weather 1076 and a clock 1078 provided by one or more widgets forming the viewing room.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. An electronic device comprising:
   a display unit;
   a storage unit adapted to store a plurality of widgets, wherein a widget is code adapted to be executed concurrently with other code; and
   a processor coupled to the storage unit, the processor to control downloading of the plurality of widgets upon gaining access as a member to a viewing room, and thereafter, to control operations of the plurality of widgets in providing interactive communications with other members of the viewing room as program content is being played back on the display unit, the program content being a stream of digital content configured for transmission to one or more electronic devices for at least one of viewing or listening.

2. The electronic device of claim 1, wherein the plurality of widgets processed by the processor are adapted to provide an user interface for displaying video received from the other members of the viewing room on the display unit.

3. The electronic device of claim 1 further comprising a plurality of speakers.

4. The electronic device of claim 3, wherein the plurality of widgets processed by the processor are adapted to playback audio received from the other members of the viewing room service over the plurality of speakers.

5. The electronic device of claim 3, wherein the plurality of widgets processed by the processor are adapted to receive and play back audio from a location where an event is being televised along with the program content associated with the televised event.

6. The electronic device of claim 1, wherein the plurality of widgets processed by the processor are adapted to maintain wagers between a user of the electronic device and the other members of the viewing room.

7. The electronic device of claim 1, wherein the plurality of widgets processed by the processor are adapted to provide a user interface and an audio-video feed of a televised show in order to allow a user of the electronic device to play against any one of the other members of the viewing room.

8. The electronic device of claim 1, wherein the plurality of widgets processed by the processor are adapted to display a profile of any one of the other members of the viewing room.

9. The electronic device of claim 1, wherein the plurality of widgets processed by the processor are adapted to signal a remote source to download program content from a selected camera angle in order to view an event from that angle.

10. The electronic device of claim 1 being a networked device in communication with a central server that lists viewing rooms that a user of the electronic device may join, download the plurality of widgets associated with a selected viewing room and provide enhanced features during display of the program content on the electronic device.

11. The electronic device of claim 1, wherein the plurality of widgets are stored within the storage unit and include a first widget that transfers information to a second widget that effectively is used by the first widget to provide additional capabilities that were absent from the first widget.

12. The electronic device of claim 11, wherein the first widget is stored in the storage unit and the second widget is stored in a remotely located electronic device.

13. The electronic device of claim 1 being a television where the processor and the storage unit are located in a back casing of the television.

14. A system comprising:
   a plurality of electronic devices each including logic to access a viewing room; and
   a viewing room service hosted by a source remotely located from the plurality of electronic devices that controls access to pre-established viewing rooms and generates instances of a viewing room of the pre-established viewing rooms that are interpreted and rendered by the logic implemented within the plurality of electronic devices,
   the instances of the viewing room include a plurality of widgets and a program content, wherein a widget is code that may be executed concurrently with other code and the program content being a stream of digital content configured for transmission to one or more electronic devices for at least one of viewing or listening.

15. A method comprising:
   determining whether a request is directed to creation of a viewing room, the viewing room being a computing platform that at least partially assists in coordinating the operations of a plurality of widgets, wherein a widget is code that may be executed concurrently with other code; and
   if the request is directed to creation of a viewing room, then selecting a plurality of widgets that collectively provide interactive functionality with viewing audiences at a plurality of electronic devices during playback of program content at each of the plurality of electronic devices, the program content being a stream of digital content configured for transmission to one or more electronic devices for at least one of viewing or listening; and
   defining rules for the viewing room that are followed by all of the plurality of electronic devices upon joining the viewing room.

16. The method of claim 15, wherein prior to determining whether the request is directed to creation of the viewing room, the method further comprises authenticating a user at the electronic device issuing the request to determine if the user has administrative privileges to create the viewing room.

17. The method of claim 15 further comprising:
   determining whether the request is directed to modifying a viewing room that has already been created; and
   determining whether a modification of the viewing room is directed to a name change, and if so, modifying the name and, before applying the modified name to the viewing room, transmitting a message to members of the viewing room and awaiting acknowledgements from the members that modification of the name is permitted.

18. The method of claim 15 further comprising:
   determining whether the request is directed to modifying a viewing room that has already been created;
   determining whether a modification of the viewing room is directed to a change in a composition of the plurality of widgets forming the viewing room, and if so, modifying at least one widget of the plurality of widgets and, before storing the modified at least one widget as part of the viewing room, transmitting a message to members of the viewing room and awaiting acknowledgements from the members that modification of the at least one widget is permitted.

19. The method of claim 15 further comprising:
determining whether the request is directed to modifying a rule for a viewing room that has already been created;
if the request involves the rule being modified, modifying the rule and, before applying the modified rule to the viewing room, transmitting a message to members of the viewing room and awaiting receipt of acknowledgements from the members that modification of the rule is permitted.

* * * * *